United States Patent Office
2,891,890
Patented June 23, 1959

2,891,890
METHOD OF TREATING PARKINSONISM

Donald Wallace Adamson, London, England, assignor to Burroughs Wellcome & Co. (U.S.A.) Inc., Tuckahoe, N.Y., a corporation of New York No Drawing. Continuation of application Serial No. 286,037, May 3, 1952. This application February 19, 1954, Serial No. 411,555

1 Claim. (Cl. 167—65)

This invention relates to a novel compound of the formula

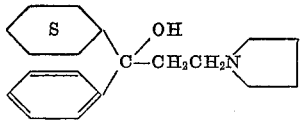

and the acid salts thereof, and the administration of this compound in the treatment of Parkinson's disease. The compound has been found to be remarkably effective in the treatment and control of this condition and it is characterized especially by lack of toxicity and toleration in continued treatment of the disease. The specific action of this compound in the treatment of Parkinson's disease is not shared in general by closely related derivatives having spasmolytic action.

Chemically this compound may be prepared by the reaction of a cyclohexyl Grignard reagent with the appropriate β-pyrrolidino-alkyl aryl ketone. Preferably, a phenyl Grignard reagent may be reacted with a β-pyrrolidino propionic ester, and the resultant γ,γ-diphenyl-γ-hydroxy-α-pyrrolidinopropane may be hydrogenated catalytically until slightly over 3 molecules of hydrogen have been absorbed thereby permitting isolation of the corresponding γ-phenyl-γ-cyclohexyl derivative, as described in copending application Serial No. 228,528, filed May 26, 1951, now Patent No. 2,682,543. This case is a continuation of application Serial No. 286,037, filed May 3, 1952, now abandoned.

*Example*

1:1-diphenyl-3-pyrrolidinopropan-1-ol (30 g.) was dissolved in glacial acetic acid (120 ml.), Adams' platinum catalyst (6 g.) added, and the mixture shaken in an atmosphere of hydrogen until the equivalent of 3.4 molecules had been taken up per molecule of compound. Water was added, the catalyst removed by filtration, excess of ammonia added, and the liberated base extracted with ether. The ethereal extract was dried and evaporated and the residue recrystallised from light petroleum (boiling point 40–60°). The 1-cyclohexyl-1-phenyl-3-pyrrolidinopropan-1-ol (19.3 g.) so obtained had a melting point of 85.5–86.5°. The hydrochloride recrystallised from a mixture of ethanol and ethyl acetate, melted with decomposition at 226–227°.

The compound is preferably administered in the form of a salt such as the hydrochloride, and all therapeutically acceptable salts are equivalents. In use the compound is conveniently made up in scored 5 mg. tablets and treatment started by administering 2.5 mg. doses three times daily. Thereafter the dosage is increased 2.5 mg per day until the maximum therapeutic response, without undesirable side effects as determined by the physician, is obtained. This point is reached in general when the total daily dosage is from about 20 to 30 mg.

I claim:

The method of treating Parkinsonism which comprises administering therapeutically a compound selected from the group consisting of those having the free base formula

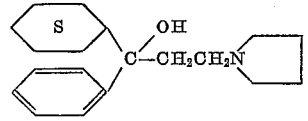

and the acid salts thereof.

References Cited in the file of this patent
UNITED STATES PATENTS

| | | |
|---|---|---|
| 2,662,886 | Ruddy | Dec. 15, 1953 |
| 2,680,115 | Ruddy | June 1, 1954 |
| 2,682,543 | Adamson et al. | June 29, 1954 |